(12) United States Patent
Lindner et al.

(10) Patent No.: US 7,988,160 B2
(45) Date of Patent: Aug. 2, 2011

(54) CLEANING CART

(75) Inventors: Falk Lindner, Hemsbach (DE);
Andreas Eisenhut, Heidelberg (DE);
Jens Deerberg, Essen (DE); Tortsen Gratzki, Eisen (DE); Dietmar Schaule, Walkertshofen (DE)

(73) Assignee: Carl Freudenberg KG, Weinheim (DE)

( * ) Notice: Subject to any disclaimer, the term of this patent is extended or adjusted under 35 U.S.C. 154(b) by 513 days.

(21) Appl. No.: 12/067,624

(22) PCT Filed: Jul. 29, 2006

(86) PCT No.: PCT/EP2006/007538
§ 371 (c)(1),
(2), (4) Date: May 22, 2008

(87) PCT Pub. No.: WO2007/033724
PCT Pub. Date: Mar. 29, 2007

(65) Prior Publication Data
US 2009/0026732 A1      Jan. 29, 2009

(30) Foreign Application Priority Data

Sep. 20, 2005 (DE) .................... 10 2005 044 984

(51) Int. Cl.
*B62B 3/00* (2006.01)
(52) U.S. Cl. ............ 280/47.34; 280/638; 280/79.3
(58) Field of Classification Search ......... 280/47.35, 280/47.26, 47.24, 47.19, 47.38, 35, 79.3, 280/639, 638
See application file for complete search history.

(56) References Cited

U.S. PATENT DOCUMENTS

| | | | | |
|---|---|---|---|---|
| 2,833,550 A | * | 5/1958 | Frick | 280/47.34 |
| D188,315 S | * | 7/1960 | Frick | D34/20 |
| 3,874,531 A | | 4/1975 | Mayo | |
| 3,908,831 A | * | 9/1975 | Brendgord | 280/79.3 |
| 4,281,843 A | * | 8/1981 | Johnson et al. | 280/47.26 |
| 4,394,049 A | * | 7/1983 | Ward | 297/423.11 |
| 4,743,040 A | * | 5/1988 | Breveglieri et al. | 280/47.35 |
| 5,531,464 A | | 7/1996 | Maurer et al. | |
| 5,791,331 A | * | 8/1998 | Stewart | 280/47.35 |
| 5,967,544 A | | 10/1999 | Kanta | |
| 6,032,965 A | | 3/2000 | Sabounjian | |
| 6,206,385 B1 | * | 3/2001 | Kern et al. | 280/47.35 |
| 6,796,565 B2 | * | 9/2004 | Choi et al. | 280/47.35 |
| 7,104,556 B1 | * | 9/2006 | Young | 280/47.35 |
| 7,648,147 B2 | * | 1/2010 | Lauer et al. | 280/47.35 |
| 7,648,155 B1 | * | 1/2010 | Wise | 280/639 |
| 2002/0064420 A1 | | 5/2002 | Lin | |

FOREIGN PATENT DOCUMENTS

| | | |
|---|---|---|
| CA | 1 082 239 | 7/1980 |
| DE | 7627791 U1 | 1/1977 |
| DE | 9301763 U1 | 5/1993 |
| DE | 10062425 B4 | 4/2006 |
| FR | 2292617 A1 | 6/1976 |
| FR | 2470719 A1 | 6/1981 |
| GB | 1322403 A | 7/1973 |
| GB | 2264088 A | 8/1993 |
| WO | WO 95/00062 A1 | 1/1995 |

* cited by examiner

*Primary Examiner* — Hau V Phan
(74) *Attorney, Agent, or Firm* — Leydig, Voit & Mayer, Ltd.

(57) ABSTRACT

A cleaning cart (1) is provided with an expandable frame (2) comprising combinable and detachably connectable elements, with a first element (3) being designed so as to be U-shaped and with its two ends (4) being bent to form right angles so that the ends (4) project outwardly from the U-shaped plane.

21 Claims, 6 Drawing Sheets

CLEANING CART

FIELD OF THE INVENTION

The invention relates to a cleaning cart with an expandable frame made of joinable and detachably connectable elements.

BACKGROUND OF THE INVENTION

This type of cleaning cart is known from WO 95/00062 A1. A cleaning cart is used to transport cleaning tools and cleaning fluids. The cleaning cart comprises a frame on which caster wheels and holding fixtures for cleaning tools are disposed. The prior-art cleaning cart has a frame which is joined together via separate detachable pieces. The separate pieces can be combined and expanded so that the frame can be made larger and smaller. Because of this modular construction, the cleaning cart can be adjusted to meet different requirements.

DE 76 27 791 U and FR 2 292 617 disclose a cleaning cart having U-shaped elements which are connected to one another by braces which are attached to the free ends of the elements.

GB 1 322 403 A and DE 93 01 763 U1 disclose a cleaning cart which comprises U-shaped elements. Disposed on the free ends of the elements are wheels, and adjacent to the free ends, connecting components are attached to the elements.

BRIEF SUMMARY OF THE INVENTION

The problem to be solved by the invention is to make available a cleaning cart which, using as few different pieces as possible, can be expanded or changed in a simple manner.

To solve the problem, a first element is designed so as to be U-shaped and both its ends are bent to form right angles. Thus, using only two elements, it is possible to make available a basic model of a cleaning cart. The elements are easily detachable and can be expanded via other elements that can also have different shapes, as a result of which a modular system is obtained. In a first useful embodiment, two first elements, the ends of which are connected, form the frame. On the frame, various attachments can be attached. Because of the geometry, the frame is stable, and various attachments can be readily attached to the frame. The height of the cleaning cart depends on the height of the legs and can be adjusted so as to achieve an ergonomic working height. It is possible to suspend additional elements from the upper cross braces of the first elements. Into the sides of the frame, side panels can be inserted so as to form an enclosed cleaning cart. This type of cleaning cart makes access to cleaning tools and in particular to cleaning fluids by third parties more difficult.

The ends of the first element can be connected to each other by a reinforcing brace. This improves the stability of the frame and provides additional attachment points to which, for example, side panels, brackets and other elements can be attached. The reinforcing brace is preferably connected to the legs by a welded connection. In the area of the base of the first element, a second reinforcing brace can be disposed, by means of which two elements can be connected to each other. This brace further increases the stability of the cleaning cart. In addition, the second reinforcing brace can form a mounting suspension for tubs, buckets and the like.

A second element can be designed so as to be H-shaped, and a third element can be designed so as to be U-shaped, with the ends of the third element being connectable to the nodal joints of the second element and with the ends of the second element being connectable to the ends of the first element. The H-shaped element, with the U-shaped element mounted on it, is disposed between the first two elements. In contrast to the basic model, this provides an additional compartment. Thus, it is possible to store mop boxes in one compartment and garbage bags in the other compartment. With the incorporation of an additional H-shaped element, three compartments are obtained. Because of their size, such cleaning carts are suitable as laundry carts for hotels. Expansions to the cleaning carts can also be added later on.

A fourth element can be designed so as to be U-shaped, with the legs of the fourth element being connected to the ends of a third element, and the ends of the fourth element can be connected to the ends of the first element or the second element. These elements are disposed outside the compartments and, because of their especially easy accessibility, are especially suitable to receive garbage bags and cleaning buckets.

The elements can have a noncircular profile. The profile may be rectangular or, most preferably, a flat oval. Such a profile has a high resistance to bending. In addition, the profile provides a good grip so that the ergonomics of the cleaning cart is further enhanced. The cleaning cart can be held and maneuvered by the frame. The flat oval profile makes it possible to attach mounting accessories, for example, holders for broomsticks and the like, easily and in a torsion-proof manner. In one embodiment, the mounting accessories can be directly screwed into the profile via receiving boreholes that are disposed on the flat side of the profile. Boreholes can be especially easily disposed on the flat side. In another embodiment, the mounting accessories are attached by a separately attached intermediate component that wraps around the profile. Because of the noncircular profile, the intermediate component is attached to the profile in a torsion-proof manner.

The legs of the fourth element can be connected to each other by at least one brace. The braces form a framework for holding cleaning buckets, with said braces being disposed in such a manner that the outer contour of the cleaning buckets or elements molded onto the bottom of the bucket, for example, base supports or circumferential ribs, snap into and are securely affixed to the braces.

The elements can be made of a metal material. Metal materials are easy to manufacture and can bear loads. If the hygienic requirements are high, the elements can be made of high-grade stainless steel.

The elements can be connected to one another by a connecting element. Connecting elements are a simple mechanism for connecting things. No complicated geometries are required on the ends of the elements to be connected since the connection is made indirectly by means of the connecting elements. The connecting element can be a plug-in component which, for example, via a snap-on connector, ensures a secure form-fitting connection without additional attachment pieces. The frame can be expanded easily and without requiring tools. The stability of the connection can be further increased by additional attachment pieces, such as splints or screws.

The connecting element can be made of a synthetic material. Injection-molded pieces can be produced especially cost-effectively. Synthetic connecting elements can be more readily inserted into the ends of elements made of metal.

On the ends of the first element, wheels can be disposed. Wheels preferably used are caster wheels which are welded to the radius of the bent cross section via a connecting element. This makes it possible to easily maneuver the cleaning cart while ensuring a high tipping stability. The mount for the wheel can also be a separate piece, for example, made of a synthetic material, which is connected in a friction-loaded and/or form-fitting manner with the straight profile sections or with the lower bent sections of the first element. The wheel is connected to the connecting element by means of a screw connection. In addition, wheels can also be disposed on the cross braces of the second and/or fourth element. Because of the additional wheels, the load-bearing capacity of the cleaning cart is increased, and the tipping stability is further improved.

The frame can hold a tray. In the tray, a variety of small-sized cleaning tools and containers with cleaning agents can be stored in an easily accessible manner.

A holder for a garbage bag can be attached on the cross brace of the first element. The garbage bag is thus easily accessible.

BRIEF DESCRIPTION OF THE DRAWINGS

A few practical examples of the cleaning cart according to the present invention will be explained in greater detail based on the figures. As can be seen, these figures are diagrammatic sketches.

DETAILED DESCRIPTION

Figure 1:
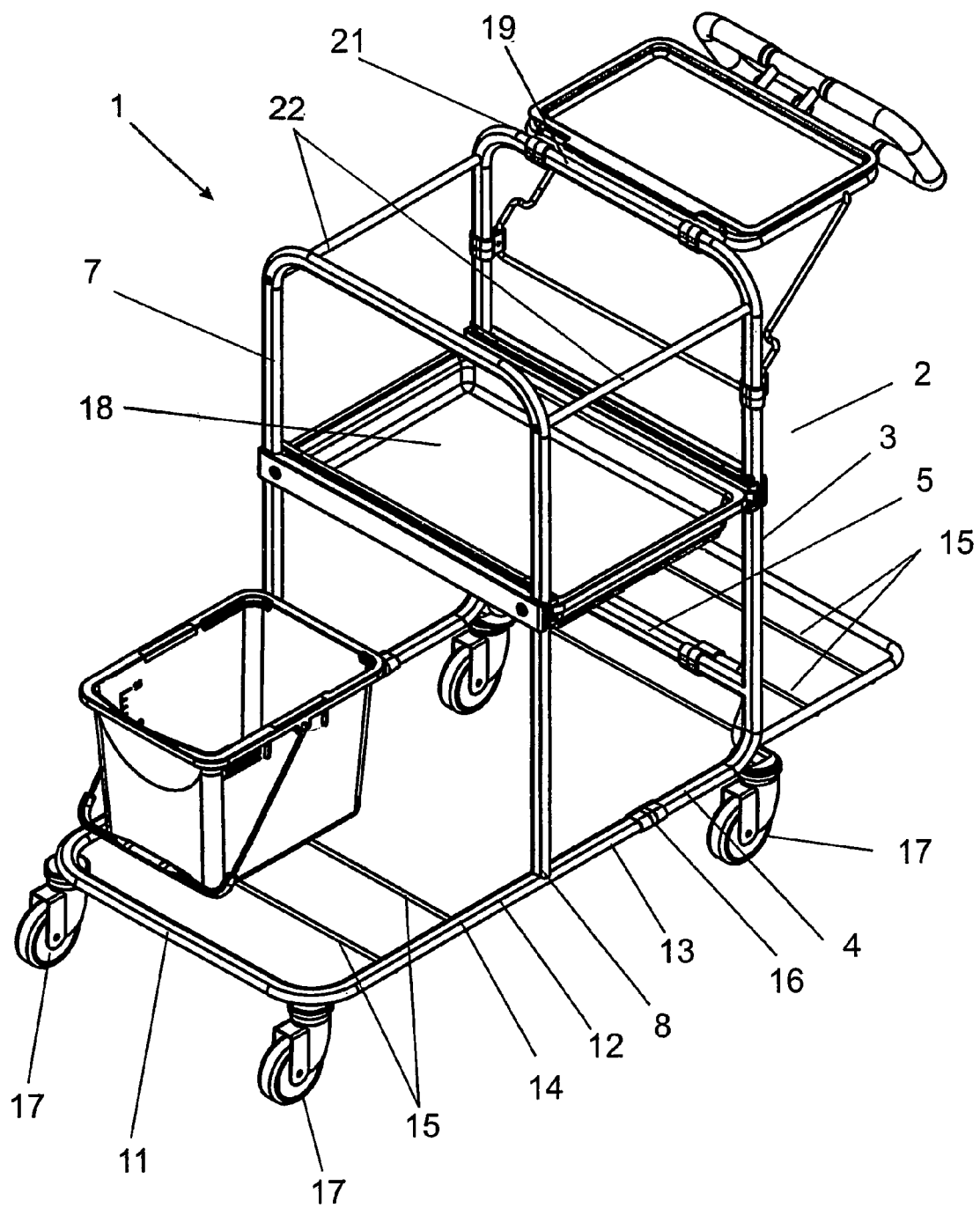
FIG. 1 is a perspective view of a cleaning cart.

FIG. 1 shows a cleaning cart 1 with an expandable frame 2. Frame 2 comprises combinable and detachably connectable elements. A first element 3 is designed so as to be U-shaped, and both of its ends 4 are bent to form right angles. The ends 4 of element 3 are connected to the ends 13 of a fourth element 11 which is designed so as to be U-shaped. On the legs 12 of the fourth element 11, a third element 7 is mounted. This third element 7 is also designed so as to be U-shaped, and the ends 8 of the third element 7 are mounted on the legs 12 of the fourth element 11. The connection of ends 4 and 13 is implemented by a connecting element 16 made of a synthetic material. The interconnected elements 3, 7 and 11 form the frame 2. To increase the stability, the ends 4 of the first element 3 and the ends 8 of the third element 7 are connected to one another by a reinforcing brace 5. In addition, the first element 3 and the third element 7 are connected to each other by an additional reinforcing brace 22. The legs 14 of the fourth elements 11 are connected to one another by several braces 15. The elements 3, 11 have a flat oval profile and are made of a metal material. On the ends 4 of the first element 3, wheels 17 in the form of caster wheels are disposed. A tray 18 which is supported by the additional reinforcing braces 22 is mounted on frame 2. The tray 18 serves to hold several cleaning buckets or small-sized cleaning tools. On the cross brace 19 of the first element 3, a holder 20 for a garbage bag is attached by means of an intermediate component 21. A holder 20 for a garbage bag can also be attached between the cross brace 19 of the first element 3 and the cross braces 19 of the second element 7.

Figure 2:
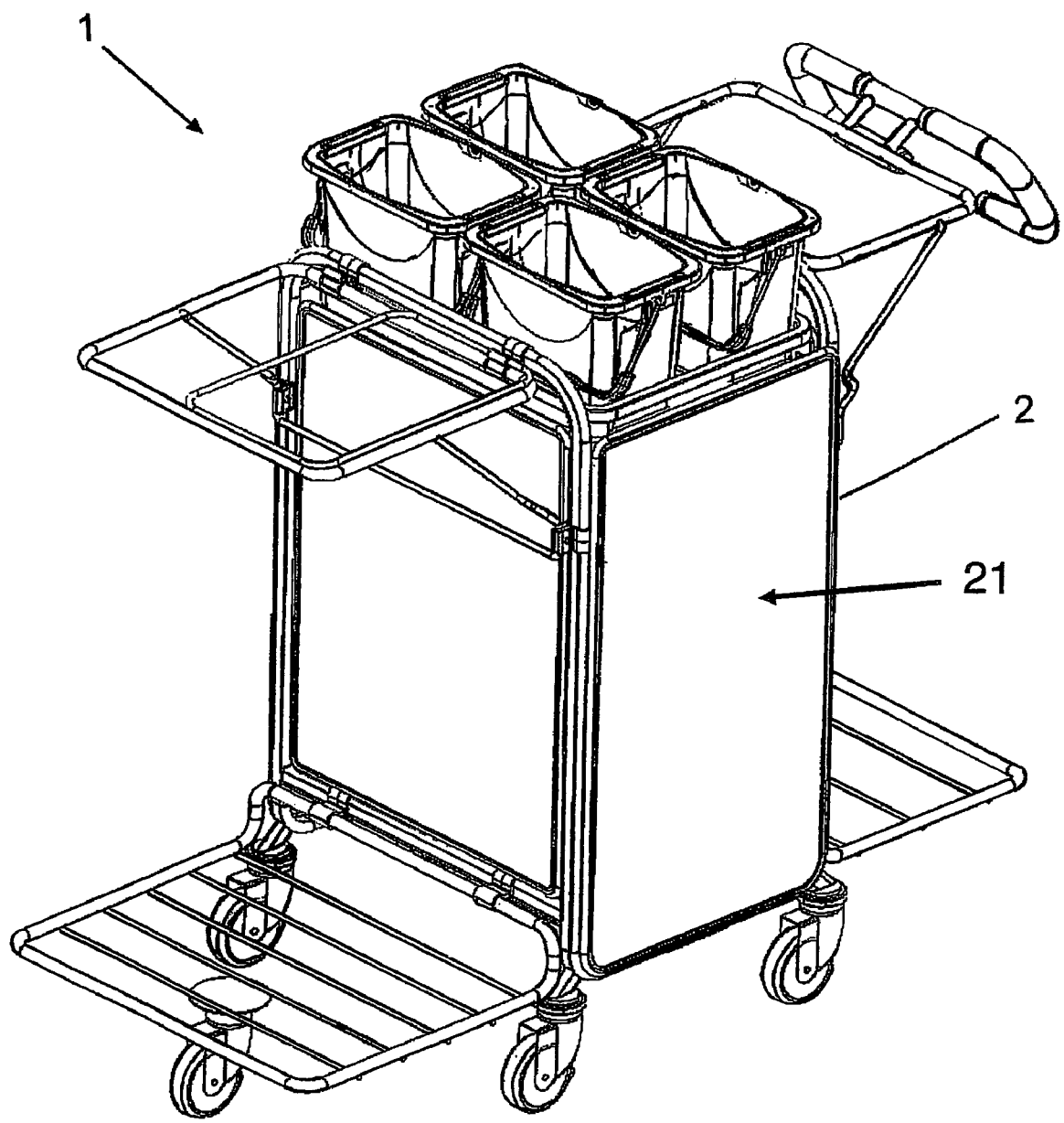
FIG. 2 is a perspective view of a cleaning cart with side panels.

FIG. 2 shows a cleaning cart 1 as seen in FIG. 1, with side panels 21 being disposed on each side in the frame 2. At least one side panel 21 is designed so as to be a swing-open door. The side panels 21 are detachably mounted on the frame 2 by synthetic connecting pieces and can be inserted or removed later on.

Figure 3:
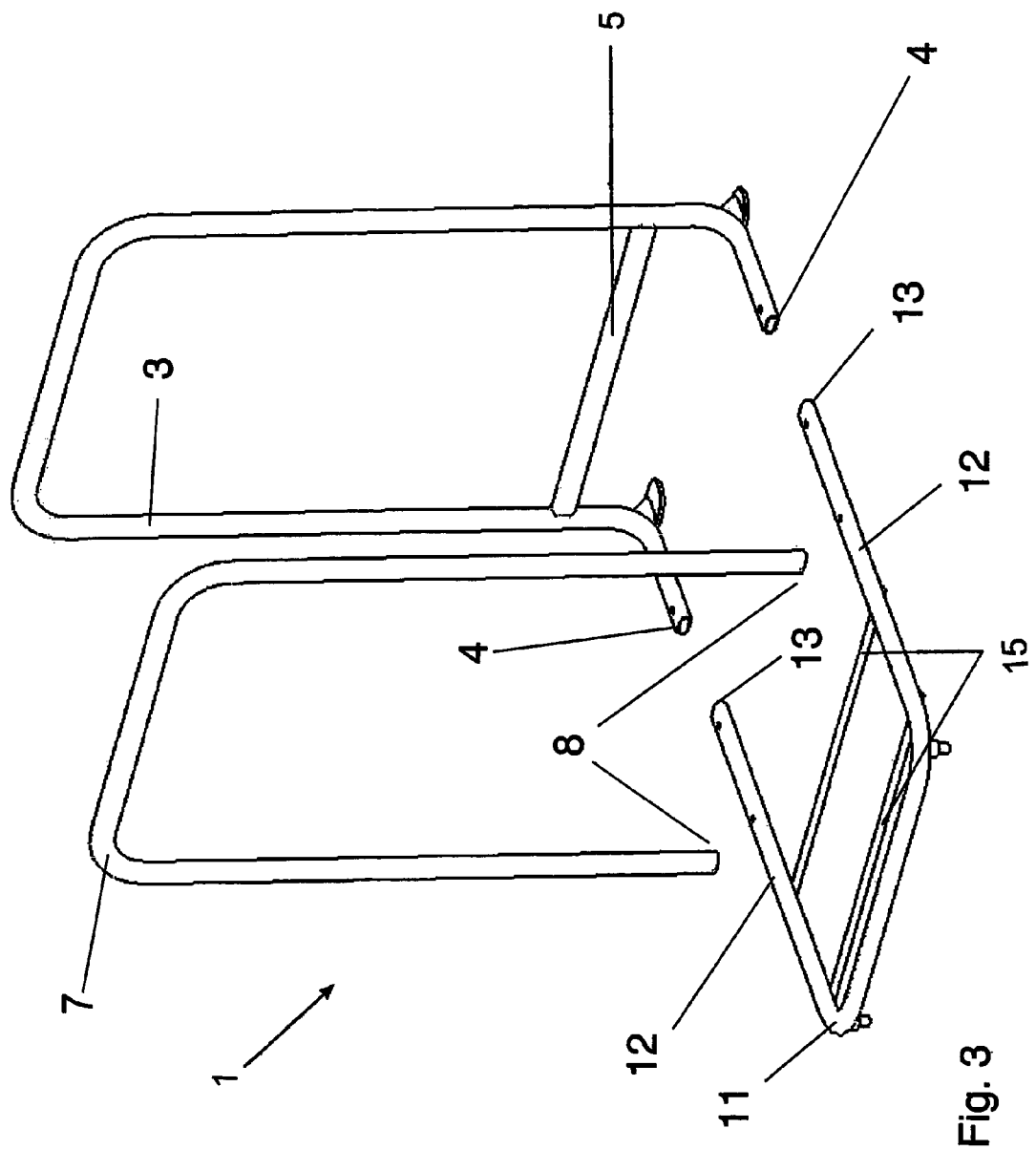
FIG. 3 is an exploded perspective view of the frame.

FIG. 3 shows an exploded view of the cleaning cart 1 as seen in FIG. 1.

Figure 4:
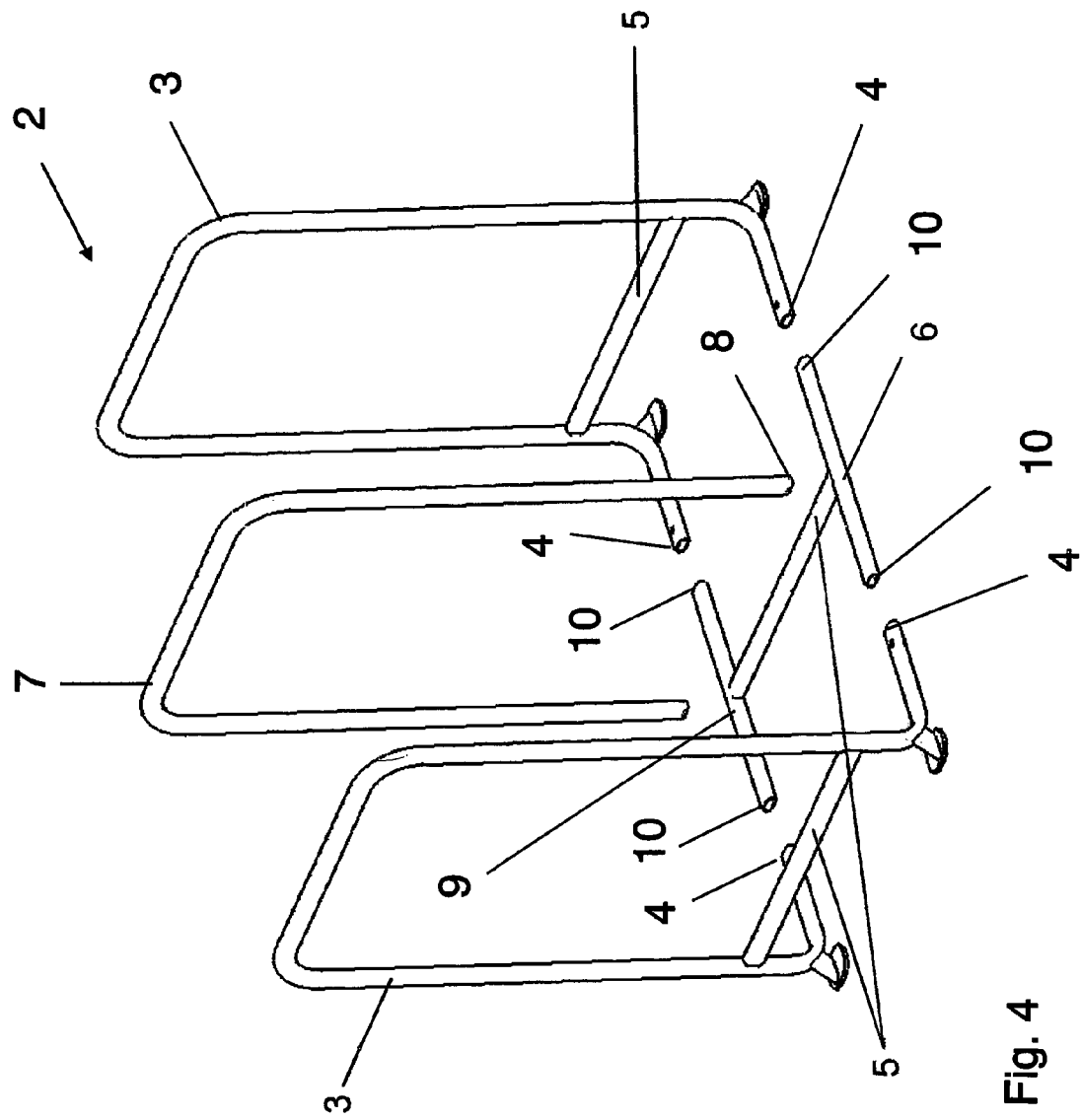
FIG. 4 is an exploded perspective view of an expanded frame.

FIG. 4 shows a frame 2 which, in contrast to frame 2 seen in FIGS. 1 to 3, has been expanded. To this end, a second H-shaped element 6 and a third U-shaped element are provided. The ends 8 of the third element 7 are connected to the nodal joints 9 of the second element 6 by means of an attached T-shaped connecting element 16 made of a synthetic material that can be detached. The ends 10 of the second element 6 are connected to the ends 4 of the first two elements 3.

Figure 5:
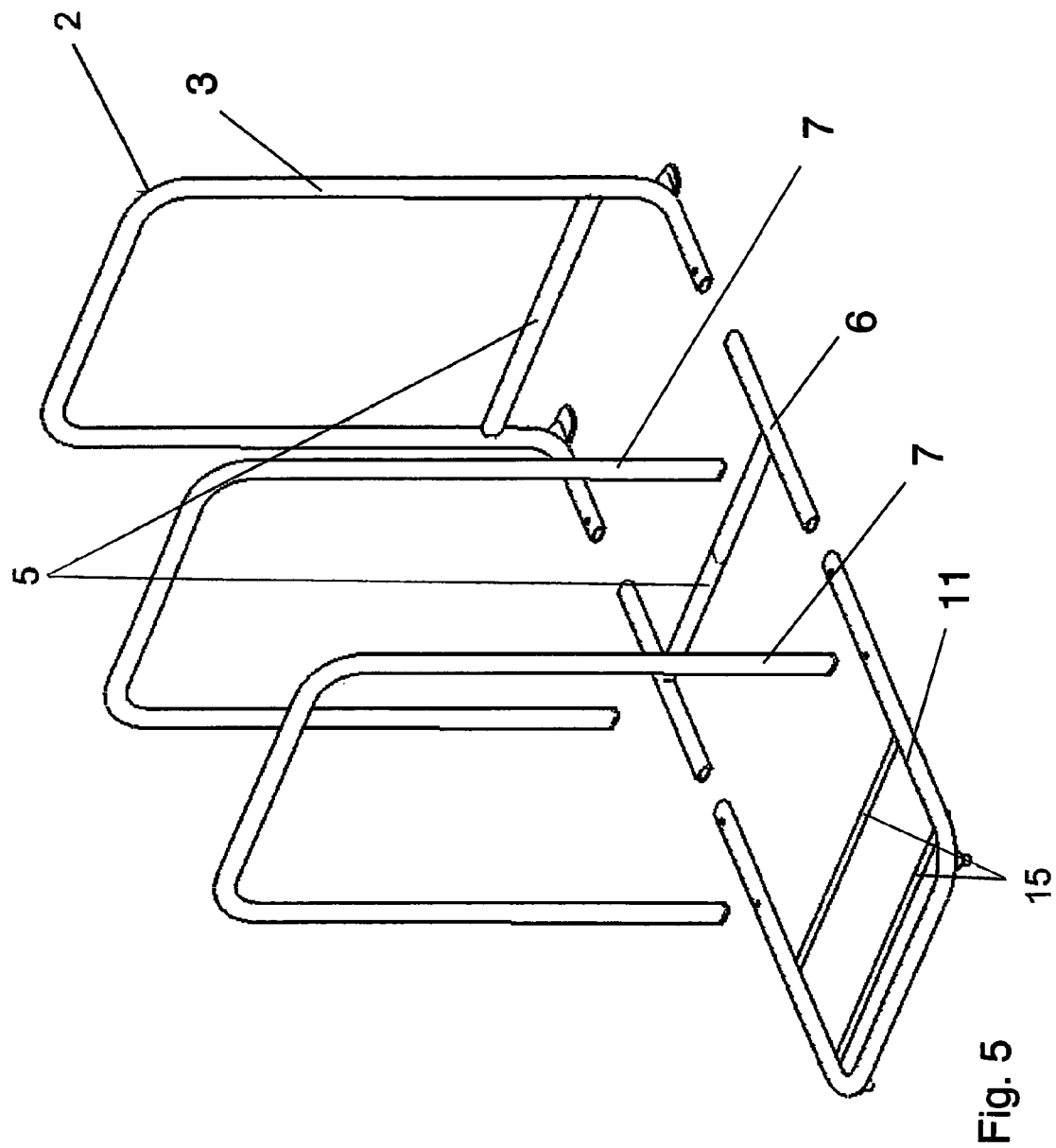
FIG. 5 is an exploded perspective view of an additionally expanded frame.

FIG. 5 shows a frame 2 as seen in FIG. 4, with a second and third elements 6,7 being disposed between the first element 3 and the fourth element 11.

Figure 6:
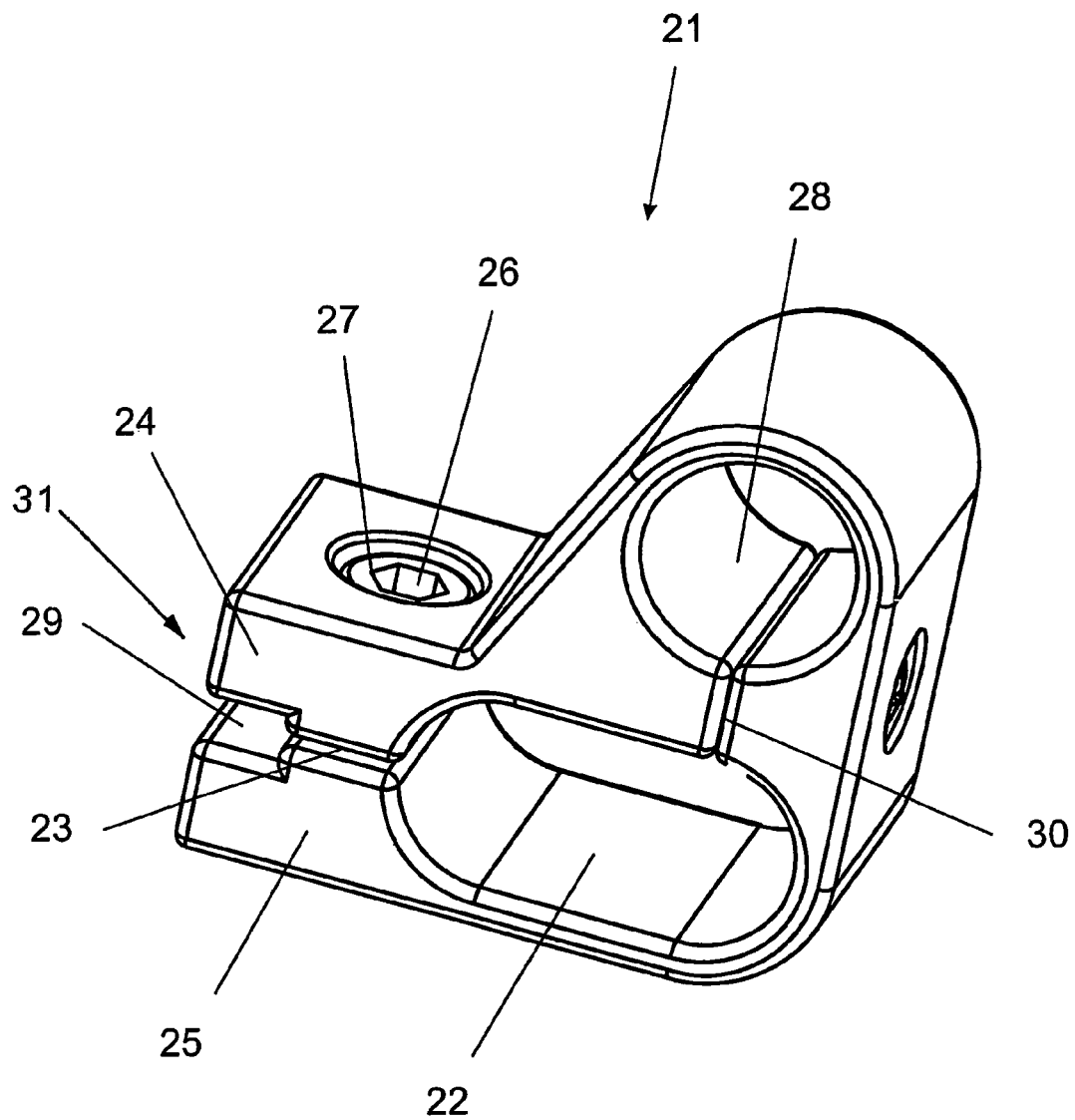
FIG. 6 is a perspective view of an intermediate component.

FIG. 6 shows an intermediate component 21, by means of which several mounting accessories, for example, a holder 20 for a garbage bag, can be attached to the cleaning cart 1. The intermediate component is a synthetic injection molded part and has a first opening 22. The first opening 22 is designed so as to be congruent with the profile of the cleaning cart 1, and in this embodiment, the first opening 22 has a flat oval shape. The first opening 22 has a laterally open slot 23. Slot 23 separates two tongues 24,25 which, due to the slot 23, are spaced at a slight distance from each other. The slot 23 has a recess 29 which is designed to receive a side panel 31. The side panel 31 is form-fitting and readily detachably retained. In the two tongues 24,25, one borehole 26 each is disposed, which borehole serves to receive an attachment element, for example, a screw. In addition, the borehole in tongue 24 also has a hexagonal recess 27 to receive a hexagonal nut. Because of the slot 23, it is also possible to attach the intermediate component 21 later on to a profile since the intermediate component 21 can be bent open and snapped onto a profile. By means of an attachment element which is inserted into borehole 26, the intermediate component 21 can be locked onto a profile. The locking effect can be determined by the distance between the two tongues 24,25. In addition, the side panel 31 can be additionally locked in the recess 29. A second opening 28 is disposed adjacent to the first opening 22. The second opening 28 serves to receive mounting accessories. The second opening 28 is connected to the first opening 22 by means of an additional slot 30. This additional slot 30 increases the flexibility of the intermediate component 21, and the intermediate component 21 can be more readily mounted onto a profile.

The invention claimed is:

1. A cleaning cart with an expandable frame comprising a plurality of combinable and detachably connectable elements including a first element having a U-shaped body with two ends that are bent to form right angles so that the ends project outwardly from a plane containing the U-shaped body, a second element having a H-shaped configuration with intermediate nodal joints and a third element with a U-shaped configuration, with the third element having ends connected to the nodal joints of the second element and the second element having ends connectable to the ends of the first element.

2. The cleaning cart as in claim 1, wherein the ends of the first element are connected to each other by a reinforcing brace.

3. The cleaning cart as in claim 1, wherein a fourth element having a U-shaped configuration, with the fourth element having ends connectable to ends of the second element.

4. The cleaning cart as in claim 3, wherein the legs of the fourth element are connected to each other by at least one brace.

5. The cleaning cart as in claim 1, wherein the elements have an oval profile.

6. The cleaning cart as in claim 1, wherein the elements are made of a metal material.

7. The cleaning cart as in claim 1, wherein the elements are connected to one another by a connecting element.

8. The cleaning cart as in claim 7, wherein the connecting element is made of a synthetic material.

9. The cleaning cart as in claim 1, wherein wheels are disposed on the ends of the first element.

10. The cleaning cart as in claim 1, wherein a tray can be mounted on the frame.

11. The cleaning cart as in claim 1, wherein a holder for a garbage bag can be attached to a cross brace of the first element.

12. A cleaning cart with an expandable frame comprising a plurality of combinable and detachably connectable elements including a first element having a U-shaped body with two ends that are bent to form right angles so that the ends project outwardly from a plane containing the U-shaped body, a second element having a U-shaped configuration, and a third element having a U-shaped configuration, with the third element having ends connectable to the ends of the first element and legs connectable to ends of the second element.

13. The cleaning cart as in claim 12, wherein the ends of the first element are connected to each other by a reinforcing brace.

14. The cleaning cart as in claim 13, wherein a holder for a garbage bag can be attached to the cross brace of the first element.

15. The cleaning cart as in claim 12, wherein the elements have an oval profile.

16. The cleaning cart as in claim 12, wherein the legs of the third element are connected to each other by at least one brace.

17. The cleaning cart as in claim 12, wherein the elements are made of a metal material.

18. The cleaning cart as in claim 12, wherein the elements are connected to one another by a connecting element.

19. The cleaning cart as in claim 18, wherein the connecting element is made of a synthetic material.

20. The cleaning cart as in claim 12, wherein wheels are disposed on the ends of the first element.

21. The cleaning cart as in claim 12, wherein a tray can be mounted on the frame.

* * * * *